United States Patent [19]

Anno et al.

[11] 4,345,664

[45] Aug. 24, 1982

[54] POWER TRANSMISSION FOR TWO-WHEELED VEHICLE

[75] Inventors: Nobuo Anno, Urawa; Haruki Okui, Wako; Kuniyuki Yamamoto, Kodaira; Kunio Miyazaki, Oimachi, all of Japan

[73] Assignee: Honda Giken Kogyo Kabushiki Kaisha, Tokyo, Japan

[21] Appl. No.: 151,622

[22] Filed: May 20, 1980

[30] Foreign Application Priority Data

May 23, 1979 [JP]  Japan ................................ 54-63642

[51] Int. Cl.³ .................... B60K 41/14; F16H 55/56; F16D 43/14
[52] U.S. Cl. .......................... 180/230; 192/105 CD; 474/13; 474/45; 474/46
[58] Field of Search ...................... 474/11, 13, 14, 15, 474/45, 46, 70, 72; 192/105 CD, 103 B, 103 R; 180/219, 230

[56] References Cited

U.S. PATENT DOCUMENTS

| | | | |
|---|---|---|---|
| 1,853,908 | 4/1932 | Lake | 192/105 CD |
| 2,556,512 | 6/1951 | Ammon | 474/14 |
| 2,790,525 | 4/1957 | Jaulmes | 474/14 X |
| 2,987,934 | 6/1961 | Thomas | 474/15 X |
| 3,208,571 | 9/1965 | Bochory | 192/105 CD |
| 3,605,511 | 9/1971 | Deschene | 474/14 |
| 3,975,964 | 8/1976 | Adams | 474/15 |

FOREIGN PATENT DOCUMENTS

| 568406 | 12/1958 | Belgium | 192/105 CD |
|---|---|---|---|
| 1162845 | 9/1958 | France | 474/15 |

*Primary Examiner*—Allan D. Herrmann
*Attorney, Agent, or Firm*—Irving M. Weiner; Pamela S. Burt; John L. Shortley

[57] ABSTRACT

A power transmission for a two-wheeled vehicle includes a variable-diameter drive pulley mechanism (2) mounted on a drive shaft (1) connected to an engine (E), a variable-diameter driven pulley mechanism (22) mounted on a driven shaft (18) operatively coupled with a driven wheel (W), and a clutch (36) mounted coaxially on the driven shaft (18) and operatively connected to the driven pulley mechanism (22). The drive and driven pulley mechanisms (2,22) are interconnected by a V-belt (7). The drive and driven pulley mechanisms (2,22) have axially movable members (5,24) located on opposite sides of the V-belt (7) adjacent to the engine (E) and the clutch (36) to allow parallel displacement of the V-belt (7) during the changing of the diameters of the pulley mechanisms (2,22), to prevent belt twisting or distortion and to prevent the belt (7) and pulley mechanisms (2,22) from being loaded while the vehicle is moved around with the engine (E) turned off.

14 Claims, 5 Drawing Figures

POWER TRANSMISSION FOR TWO-WHEELED VEHICLE

BACKGROUND OF THE INVENTION

1. Field of the Invention

The present invention relates to a power transmission utilizing a belt and pulleys for a two-wheeled motorcycle.

2. Description of Relevant Art

There has been proposed a motorcycle power transmission including a V-belt and variable-diameter pulleys. With the proposed arrangement, one of the pulleys is mounted on the output shaft of the engine and the other pulley is mounted on the shaft for the driven wheel, the pulleys being interconnected by the V-belt. As the number of revolutions of the engine increases, a movable surface of the pulley associated with the engine is shifted so that the diameter of the pulley is increased, and a movable surface of the pulley associated with the driven wheel is shifted due to displacement of the V-belt so that the pulley diameter is reduced, whereby automatic speed changing is effected.

During operation of the prior power transmission, the movable members of the drive and driven pulley mechanisms are shifted in opposite directions as the engine speed varies, with the result that the V-belt is laterally displaced in opposite directions at the drive and driven pulleys. Accordingly, the V-belt tends to be twisted or distorted, putting undue stresses on the surfaces of the drive and driven pulleys with which the V-belt engages. Localized wear results in such belt-engaging surfaces, the service life and durability of the power transmission becomes poor, and the efficiency in power transmission is reduced. While a relatively long V-belt can take up a twist satisfactorily, short V-belts are unable to do so. Therefore, the conventional power transmission must necessarily be large in size, and cannot be applied to a small-sized two-wheeled motorcycle.

Another disadvantage with the known power transmission is that a clutch is located adjacent to the engine, such that the pulleys and belt between the engine and the rear wheel will necessarily be rotated with the rear wheel, including when the motorcycle is moved around with the engine turned off. It is therefore hard and laborious to manually move the motorcycle around while the engine is not in operation.

SUMMARY OF THE INVENTION

The present invention provides a power transmission for a two-wheeled motorcycle, comprising an engine, a drive shaft driven by the engine, a variable-diameter drive pulley mechanism connected to the drive shaft, and a variable-diameter driven pulley mechanism. A V-belt extends around the drive and driven pulley mechanisms for operative connection therebetween. Clutch means is operatively connected with the driven pulley mechanism. A driven shaft coaxially supports the driven pulley mechanism and the clutch means. A wheel is driven by the driven shaft. The drive and driven pulley mechanisms including axially movable members, respectively, support the V-belt at the sides thereof. The axially movable members of the respective drive and driven pulley mechanisms are located on opposite sides of the V-belt and adjacent to the engine and the clutch means, respectively.

It is an object of the present invention to provide a power transmission for a two-wheeled motorcycle, having a transmission V-belt which is free of localized wear and twists or distortions when variable-diameter pulley mechanisms are actuated for changing their diameters.

Another object of the present invention is to provide a motorcycle power transmission having a clutch located adjacent to the rear wheel for allowing the motorcycle to be moved around easily and smoothly when the engine is turned off.

Still another object of the present invention is to provide a motorcycle power transmission having prolonged service life and increased durability.

Still another object of the present invention is to provide a motorcycle power transmission including means for reliably supplying lubricant to movable members of pulley mechanisms for smooth and reliable operation thereof.

Still another object of the present invention is to provide a motorcycle power transmission including a unit comprising a pulley mechanism and a clutch that is protected for smooth and reliable operation thereof against lubricant leakage from the associated pulley mechanism.

According to the present invention, a variable-diameter drive pulley mechanism is mounted on the crankshaft of an engine and a variable-diameter driven pulley mechanism is mounted on a driven shaft to which a motorcycle rear wheel is connected, there being a V-belt trained around the drive and driven pulley mechanisms. The drive and driven pulley mechanisms have axially movable members, respectively, engaging the sides of the V-belt and located one on each side of the V-belt. A centrifugal clutch is also mounted on the driven shaft and is operatively connected to the driven pulley mechanism and located remotely from the rear wheel. The movable members of the respective drive and driven pulley mechanisms are located adjacent to the engine and the clutch, respectively.

The above and other objects, features, and advantages of the present invention will become apparent from the following detailed description when read in conjunction with the accompanying drawings which illustrate a preferred embodiment by way of example.

DETAILED DESCRIPTION

Figure 1:
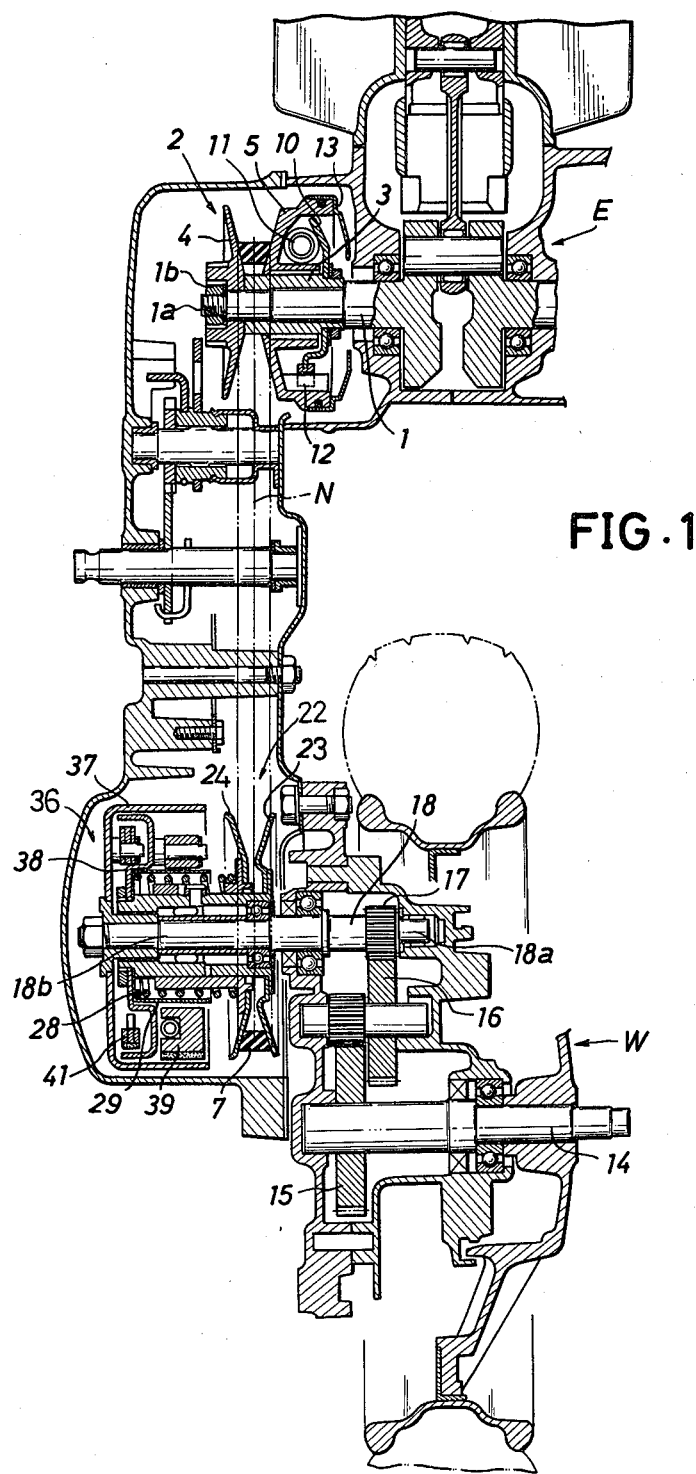
FIG. 1 is a cross-sectional view of a power transmission according to the present invention, with an engine and a wheel being partly omitted.
Figure 2:
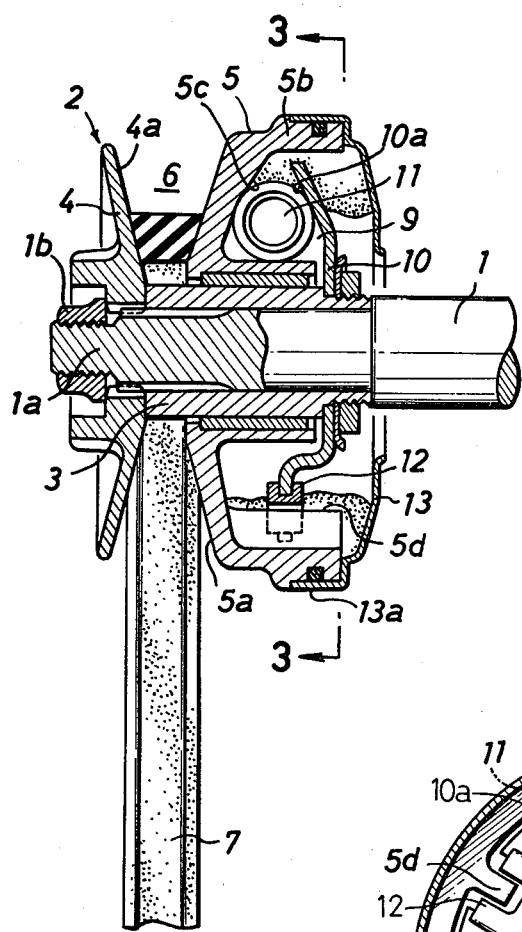
FIG. 2 is an enlarged cross-sectional view of a pulley mechanism associated with an engine.

In FIG. 1, an engine E has a power-output drive shaft or crankshaft 1 including a crankshaft extension 1a on which there is mounted a variable-diameter pulley mechanism 2. The pulley mechanism 2 comprises a fixed circular member 4 mounted through splines on a distal end portion of the crankshaft extension 1a, and a movable drum-shaped member 5 axially movably mounted on a sleeve 3 fitted through splines over the crankshaft extension 1a adjacent to the fixed member 4. The fixed member 4 and the sleeve 3 are retained on the crankshaft extension 1a by a nut 1b threaded over the distal end thereof. With reference to FIG. 2, the fixed member 4 includes a conical surface 4a facing toward the engine E, and the movable drum-shaped member 5 includes an outer conical surface 5a axially confronting the conical surface 4a of the fixed member 4. The movable member 5 is located closer than the fixed member 4 to the engine E. The conical surfaces 4a, 5a of the respective pulley members 4, 5 jointly define an annular groove 6 having a V-shaped cross section for receiving an endless V-belt 7 with its sides engaged by the conical surfaces 4a, 5a, respectively.

As shown in FIG. 2, the movable drum-shaped member 5 includes an annular wall 5b extending axially toward the engine E, and an inner conical surface 5c that is axially opposite to the conical surface 5a and faces toward the engine E. The annular wall 5b and the conical surface 5c jointly define a space 9 in which there is disposed a ramp plate 10 mounted on an end of the sleeve 3 remote from the fixed member 4.

Figure 3:
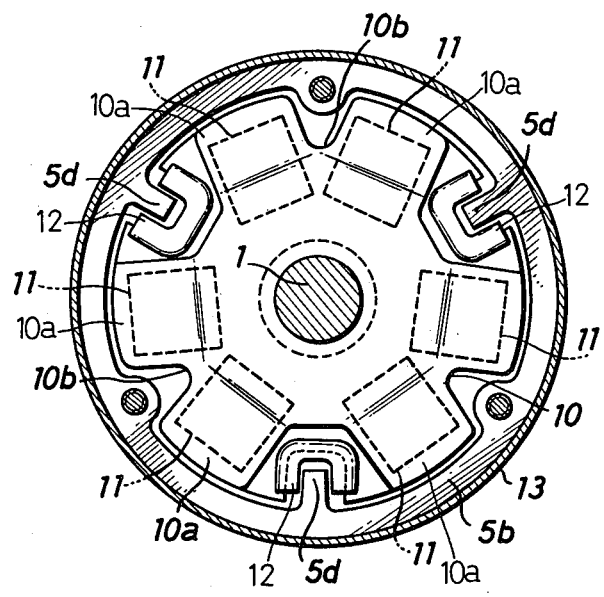
FIG. 3 is a cross-sectional view taken along line 3—3 of FIG. 2.

As best illustrated in FIG. 3, the ramp plate 10 includes on its peripheral edge portion adjacent to the annular wall 5b of the movable member 5, a plurality of radial projections 10a inclined toward the conical surface 5c of the movable member 5 (FIG. 2), there being a plurality of roller weights 11 each located between the conical surface 5c and one of the radial projections 10a. A plurality of U-shaped radial slides 12 are fixed to peripheral recessed portions of the ramp plate 10 which are positioned adjacent two of the radial projections 10a. The U-shaped slides 12 axially slidably engage a plurality of guides 5d, respectively, projecting radially inwardly from the annular wall 5b of the movable member 5. The ramp plate 10 also includes a plurality of radial notches 10b each located between alternate adjacent radial projections 10a.

The space 9 thus accommodating the ramp plate 10 is substantially closed by a cover 13 having a peripheral edge 13a secured to the annular wall 5b, with a predetermined annular clearance being defined between the inner portion of cover 13 and crankshaft 1. A ring of lubricant, such as grease, is placed in the space 9 so as to be axially flowable across the ramp plate 10 through the notches 10b.

The engine E and its crankshaft 1 are mounted centrally on a two-wheeled motorcycle (not shown). The motorcycle includes a rear driven wheel W (FIG. 1) disposed on the same side of the power transmission mechanism as the engine E, and having an axle 14 drivable through a train of meshing gears 15, 16 and 17 by an input or driven shaft 18 extending parallel to the crankshaft 1. A unit comprising a variable-diameter pulley mechanism 22 and a centrifugal clutch 36 is mounted on a portion 18b of the shaft 18 which is remote from an end portion 18a supporting the gear 17 thereon.

Figure 4:
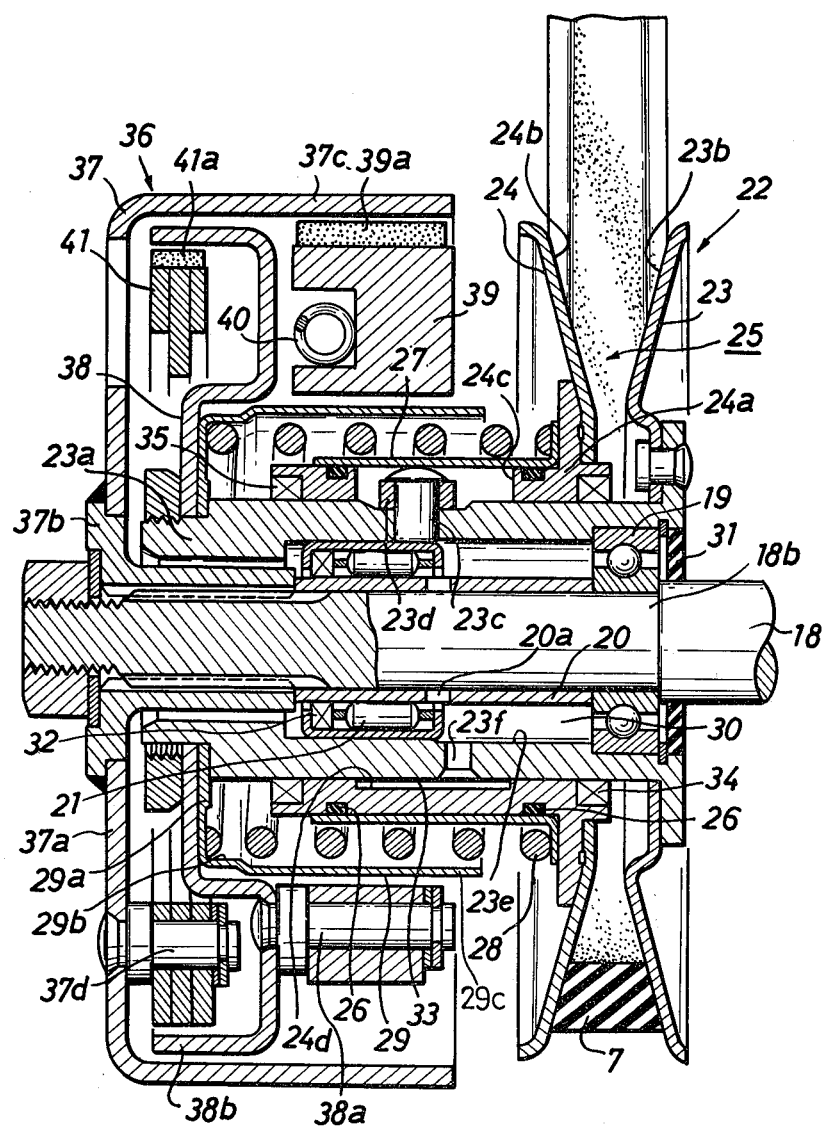
FIG. 4 is an enlarged cross-sectional view of a unit including a pulley mechanism and a clutch associated with a rear wheel.

As shown in FIG. 4, a ball bearing 19 is fitted over the portion 18b of the driven shaft 18. A needle bearing 21 is mounted on a collar 20 fitted over the driven shaft portion 18b. The variable-diameter pulley mechanism 22 includes an axially immovable or fixed pulley member 23 fixed to a sleeve shaft 23a at its righthand end adjacent to the rear wheel W. The sleeve 23a is fitted over the needle bearing 21. The pulley member 23 has a conical surface 23b facing away from the rear wheel W. A sleeve shaft 24a is axially movably mounted around the sleeve shaft 23a, and supports thereon a movable pulley member 24 located remote from the rear wheel W. The pulley member 24 has a conical surface 24b which confronts the conical surface 23b of the pulley member 23. The conical surfaces 23b, 24b jointly define an annular groove 25 of a V-shaped cross section receiving the V-belt 7 therein.

The sleeve shaft 24a has an axially elongated skewed hole 24c receiving therein a guide roll 23d on a pin 23c projecting radially outwardly from the sleeve shaft 23a. The sleeve shaft 24a is guided by the guide roll 23d in the elongated hole 24c for axial sliding movement on the sleeve shaft 23a. The pulley members 5, 24 are axially movable in the same direction on the parallel shafts 1, 18, respectively. An outer sleeve 27 is mounted around the sleeve shaft 24a with a pair of O-rings 26 therebetween, the outer sleeve 27 covering the elongated hole 24c in a fluid-tight manner.

The centrifugal clutch 36 includes a circular drive plate 38 fixed to the sleeve shaft 23a at one end thereof remote from the pulley member 23, the centrifugal clutch 36 thus being disposed on the side closest to movable pulley member 24 of the pulley members 23, 24. A compression coil spring 28 is placed in a state of compression between the movable pulley member 24 and the drive plate 38 to normally urge the pulley member 24 axially toward the pulley member 23. A cylindrical cover 29 has an end wall 29a mounted on said one end of the sleeve shaft 23a and disposed between the drive plate 38 and the end of the spring 28 which is adjacent to the drive plate 38. The cylindrical cover 29 includes a smaller-diameter portion 29b adjacent to the end wall 29a, holding the end of the spring 28, and a sleeve portion 29c extending axially over the spring 28 out of the clutch 36 for protecting the clutch 36 against lubricant leakage or splashes as described hereinbelow. The sleeve portion 29c does not interfere with the pulley member 24 even when it is at the end of an axial stroke thereof toward the clutch 36.

The sleeve shaft 23a has an internal bore 23e including a first lubricant reservoir 30 defined by the collar 20, the ball bearing 19 and the needle bearing 21 and in which lubricant, such as grease, is sealingly contained. Oil seals 31, 32 are attached respectively to the bearings 19, 21 on their axially outward sides for sealing the lubricant reservoir 30. The grease is supplied into the reservoir 30 through holes 20a in the collar 20.

The sleeve shaft 24a has a radially inward recess 24d facing the periphery of the sleeve shaft 23a and serving as a second lubricant reservoir 33, which communicates with the first lubricant reservoir 30 through a hole 23f in the sleeve shaft 23a. Oil seals 34, 35 are mounted on the ends of the sleeve shaft 23a for sealing the second lubricant reservoir 33 in a fluidtight manner. Thus, the lubricant is supplied from the first lubricant reservoir 30 through the hole 23f into the second lubricant reservoir 33 for lubrication between the sleeve shafts 23a, 24a. Any lubricant that may leak out of the sleeve shaft 24a is prevented by the cylindrical cover 29 from getting into the clutch 36.

The clutch 36 includes a drum-shaped outer member 37 having an end wall 37a secured to an axial sleeve 37b mounted through splines on the end of the driven shaft 18 by a nut 18c threaded over the shaft end. The outer clutch member 37 also includes a cylindrical wall 37c projecting axially toward, but short of, the movable member 24. The drive plate 38 is disposed in the drum-shaped outer member 37. A clutch weight 39 is pivotally mounted by a pin 38a on the drive plate 38. A clutch shoe 39a is fixed around the clutch weight 39. The clutch weight 39 is urged by a spring 40 in a direction away from the annular wall 37c.

The drive plate 38 includes a peripheral flange 38b facing a shoe 41a secured around a back-loading clutch weight 41 pivotally mounted by a pin 37d on the end wall 37a of the outer member 37.

Operation of the power transmission thus constructed is as follows. The parts take the illustrated position when the engine E is stopped or operated at slow speeds of rotation. While the engine E is being operated, the power flows from the crankshaft 1 to the pulley mechanism 2, the V-belt 7, then to the pulley mechanism 22. The V-belt 7 runs around the pulley mechanisms 2, 22 with its central axis N extending perpendicularly to the shafts 1, 18. During such power transmission, the V-belt 7 frictionally engages the conical surfaces 23a, 24b of the fixed and movable pulley members 23, 24, respectively, for rotation thereof. The rotation of the sleeve shaft 23a of the pulley member 23 causes the drive plate 38 to rotate. When the drive plate 38 rotates at or above a predetermined speed, the clutch weight 39 is displaced radially outwardly under centrifugal forces against the spring 40 to cause the shoe 39a to frictionally engage the cylindrical wall 37c, thereby coupling the drive plate 38 and the outer clutch member 37 together for rotation. The clutch 36 is thus actuated, enabling the driven shaft 18 to rotate, whereupon the rear wheel W is rotatively driven via the train of gears 17, 16 and 15.

As the number of revolutions of the engine E increases, the roller weights 11 between the movable member 5 and the ramp plate 10 are shifted radially outwardly under centrifugal forces into engagement with the conical surface 5c and the radial projections 10a. This forcibly pushes the movable member 5 axially toward the fixed member 4 on the sleeve 3 away from the engine E. As a result, the V-shaped groove 6 between the fixed and movable members 4, 5 is narrowed, whereupon the effective diameter of the pulley mechanism 2 is increased. The belt 7 as it travels around the pulley mechanism 2 runs along a radially outwardly displaced circular path. The belt 7 and hence its central axis N are slightly displaced leftwardly in FIG. 1.

The belt 7 is now pulled slightly toward the pulley mechanism 2, and as the belt 7 travels along the V-shaped groove 25 in the pulley mechanism 22, it is squeezed radially inwardly between the fixed and movable members 23, 24. The movable pulley member 24 is axially displaced against the force of the spring 28 away from the fixed member 23 leftwardly in FIG. 1 along the sleeve shaft 23a. The belt 7 is slightly moved leftwardly axially of the shaft 18 as the movable pulley member 24 is displaced in the same direction, to thereby reduce the effective diameter of the pulley mechanism 22. The ratio of speed change between the pulley mechanisms 2, 22 is thus decreased, thereby increasing the speed of rotation of the driven shaft 18. The V-belt 7 is now bodily shifted leftwardly as both the pulley member 5 and the pulley member 23 are shifted leftwardly, with the result that the central axis N of the belt 7 is maintained perpendicular to the shafts 1, 18. Accordingly, the belt 7 is prevented from being twisted or distorted during the change of the effective diameters of the pulley mechanisms 2, 22. The sides of the belt 7 are at all times maintained in parallel and in close contact with the conical surfaces 4a, 5a and 23a, 24a of the pulley members 4, 5 and 23, 24, respectively. This allows smooth continuous speed changing without undue strains on the belt, and increases the service life and durability of the belt 7 and pulley mechanisms 2, 22.

The rear wheel W while rotating is sometimes subjected to varying loads due to different road conditions. Such changes in load are transmitted through the driven shaft 18, the outer clutch member 37, and the drive plate 38 to the sleeve shaft 23a operatively connected to the sleeve shaft 24a by the pin 23c received in the elongated skewed hole 24c. A difference in rotation, due to such load changes, results in a relative movement of the pin 23c to guide the sleeve shaft 24a and hence the movable pulley member 24 to be slid axially, whereupon the belt 7 is also axially moved to take up the load variations.

When the motorcycle is being moved around while the engine E is off, the clutch weight 39 on the drive plate 38 is withdrawn under the force from the spring 40, and thus the drive plate 38 is separated from the other clutch member 37. The rotation of the rear wheel W and hence the driven shaft 18 results only in rotation of the outer clutch member 37, with the belt 7 and the pulley mechanisms 2, 22 being inoperative. Thus, the motorcycle can be maneuvered smoothly with a small force.

While the motorcycle is moving down a slope at high speeds with the engine E being turned off, the weight 41 attached to the outer clutch member 37 is moved radially outwardly under centrifugal forces to cause the shoe 41a to frictionally engage the peripheral flange 38b of the drive plate 38. At this point the outer clutch member 37 and hence the rear wheel W are coupled with the pulley mechanism 22 and hence the belt 7, thereby braking the rear wheel W.

The pulley mechanism 22 is supplied with lubrication between the sleeve shafts 23a, 24a and the clutch 36 is protected by the cover 29 against lubricant splashes or leakage in a manner as described hereinabove.

The pulley mechanism 2 is lubricated as follows. As the pulley mechanism 2 rotates at higher speeds, the lubricant in the space 9 closed by the cover 13 flows radially outwardly under centrifugal forces. Since the peripheral edge of the ramp plate 10 is positioned close to the annular wall 5b, the lubricant is forced under pressure to flow mainly through the notches 10b in the plate 10. The lubricant as it flows lubricates the roller weights 11 that are held in contact with the conical surface 5c and the radial projections 10a.

When the number of revolutions of the crankshaft 1 decreases, the roller weights 11 are moved back radially inwardly and most of the lubricant that has flowed out of the ramp plate 10 is returned through the notches 10b and between the conical surface 5c and the radial projections 10a for lubrication of the roller weights 11. Such movement of the lubricant is accelerated by a sudden increase of empty space between the conical surface 5c and the radial projections 10a as the roller weights 11 are moved radially inwardly. Therefore, the pulley mechanism 2 can be actuated smoothly for automatically changing its diameter.

Figure 5:
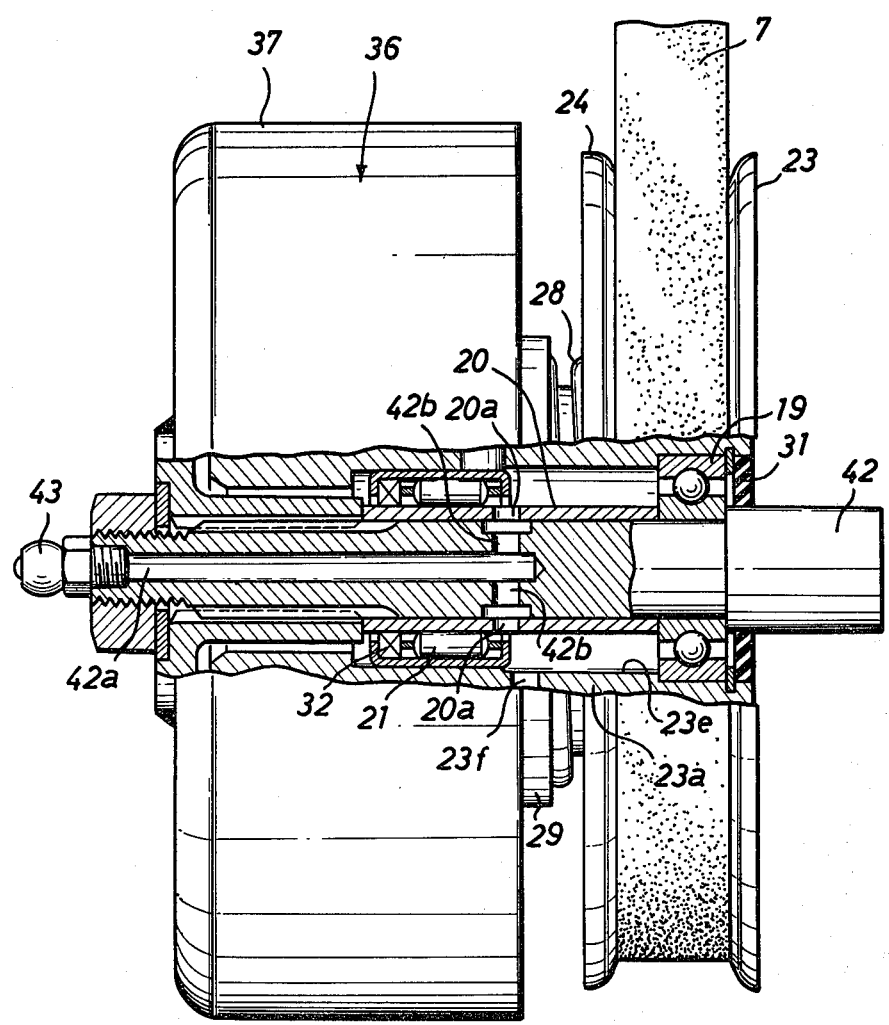
FIG. 5 is a plan view, partly broken away, of the unit shown in FIG. 4, with an attachment rod being mounted in the unit for supplying lubricant to the pulley mechanism.

In FIG. 5, the driven shaft 18 is replaced with an attachment rod 42 having the same diametrical dimension as that of the shaft 18. The attachment rod 42 has an axial passage 42a and radial passages 42b that are in fluid communication with the holes 20a. A nipple 43 on an end of the attachment rod 42 is removed for replenishing lubricant, such as grease, through the passage 42a, the passages 42b, the holes 20a, into the first lubricant reservoir 30.

Although a certain preferred embodiment has been shown and described in detail, it should be understood that many changes and modifications may be made without departing from the scope of the appended claims.

We claim:

1. A power transmission for a two-wheeled motorcycle, comprising:
   (a) an engine (E);
   (b) a drive shaft (1) driven by said engine (E);
   (c) a variable-diameter drive pulley mechanism (2) connected to said drive shaft (1);
   (d) a variable-diameter driven pulley mechanism (22);
   (e) a V-belt (7) extending around said drive and driven pulley mechanisms (2, 22) for operative connection therebetween;
   (f) clutch means (36) operatively connected with said driven pulley mechanism (22);
   (g) a driven shaft (18) coaxially supporting said driven pulley mechanism (22) and said clutch means (36);
   (h) a wheel (W) driven by said driven shaft (18), said wheel (W) being disposed on the same side of the power transmission mechanism as said engine (E);
   (i) said drive pulley mechanism (2) including an axially movable member (5) and an axially fixed member (4), disposed on the side closest to said engine and on the opposite side with respect to said V-belt, respectively, said members (23, 24) supporting said V-belt therebetween;
   (j) said driven pulley mechanism (22) including an axially movable member (24) and an axially fixed member (23), disposed on the side closest to said clutch means and on the opposite side with respect to said V-belt, respectively, said members (23, 24) supporting said V-belt therebetween; and
   (k) said clutch means comprising a centrifugal clutch including an outer member (37) connected to said driven shaft, and a drive plate (38) integrally connected to said driven pulley mechanism, said drive plate (38) including an element for frictionally engaging said outer member (37) upon actuation of said element under centrifugal forces.

2. A power transmission according to claim 1, wherein:
   said element for frictionally engaging said outer member comprises a clutch weight pivotably mounted on said drive plate, said clutch weight having a clutch shoe fixed therearound for frictionally engaging said outer member under said centrifugal forces.

3. A power transmission according to claim 1, including:
   an element mounted on said outer member for frictionally engaging said drive plate under centrifugal forces during rotation of said outer member.

4. A power transmission according to claim 1, wherein:
   said movable member of the drive pulley mechanism has an outer conical surface engaging said V-belt and an inner conical surface opposite to said outer conical surface;
   a ramp plate is mounted on said drive shaft and has a plurality of portions inclined toward said inner conical surface;
   a plurality of roller weights are each disposed between said inner conical surface and one of said inclined portions;
   said movable member of said drive pulley mechanism is axially movable by radially outward movement of said roller weights under centrifugal forces upon rotation of said drive shaft;
   said movable member of the drive pulley mechanism has a circular closed space therein containing a ring of lubricant;
   a substantially ring-shaped cover (13) is supported at the outer periphery thereof on said movable member of the drive pulley mechanism so as to substantially close said circular space with a predetermined annular clearance defined between the inner portion of said ring-shaped cover (13) and said drive shaft; and
   said ramp plate includes lubricant passages in the periphery thereof which communicate with a space in which said roller weights are disposed.

5. A power transmission according to claim 1, wherein:
   said axially fixed member of said driven pulley mechanism is located adjacent to the rear wheel of said motorcycle and secured to a first sleeve shaft rotatably mounted via axially spaced bearings on said driven shaft;
   said movable member of said driven pulley mechanism is located adjacent to said clutch means and has a second sleeve shaft axially movably fitted over said first sleeve shaft and slidable relatively to said first shaft for a limited mutual angular extent; and
   said driven pulley mechanism has a first lubricant reservoir defined by said first sleeve shaft, said bearings, and said driven shaft, and a second lubricant reservoir defined between said first and second sleeve shafts and communicating with said first reservoir through a lubricant passage in said first sleeve shaft.

6. A power transmission according to claim 5, including:
   a collar fitted over said driven shaft and bounding said first lubricant reservoir, said collar having a lubricant-supply hole.

7. A power transmission according to claim 5, including:
   a spring disposed around said second sleeve shaft and normally urging said movable member toward said fixed member of the driven pulley mechanism; and
   a cylindrical cover surrounding said spring for guiding the same and protecting said clutch means against lubricant.

8. A power transmission according to claim 7, wherein:
   said clutch means is provided so as to surround said spring and said cylindrical cover.

9. A power transmission according to claim 4, wherein:
   said movable member of said drive pulley mechanism includes an annular wall extending axially toward said engine;
   said circular closed space is defined by said inner conical surface and said annular wall of said movable member of said drive pulley mechanism; and
   said ramp plate is disposed within said circular closed space.

10. A power transmission according to claim 9, wherein:
  a plurality of radial slides are fixed to peripheral portions of said ramp plate adjacent two of said inclined portions;
  said annular wall is provided with a plurality of radially inwardly projecting guides; and
  said radial slides are adapted to axially slidably engage said guides, respectively.

11. A power transmission according to claim 4 or 9, wherein:
  said movable member of said drive pulley mechanism is axially movably mounted on a sleeve fitted over a portion of said drive shaft adjacent to said axially fixed member of said drive pulley mechanism; and
  said ramp plate is mounted on an end of said sleeve remote from said fixed member of said drive pulley mechanism.

12. A power transmission according to claim 5, wherein:
  said drive plate of said centrifugal clutch is fixed to said first sleeve shaft at an end thereof remote from said fixed pulley member of said driven pulley mechanism.

13. A power transmission for a two-wheeled motorcycle provided with an engine and a drive shaft driven thereby, comprising:
  a variable-diameter drive pulley mechanism connected to said drive shaft;
  a variable-diameter driven pulley mechanism and a centrifugal clutch coaxially supported on a driven shaft for driving a wheel of said motorcycle;
  a V-belt extending around said drive and driven pulley mechanisms so as to transmit power from said drive shaft, via said drive pulley mechanism, to said driven pulley mechanism;
  said centrifugal clutch operatively cooperating with said driven pulley mechanism so as to be actuated by said driven pulley mechanism at or above a predetermined speed of rotation effected by said power transmitted from said drive shaft, to in turn drive said wheel via said driven shaft;
  said power transmission being disposed on one and the same side of said engine and said wheel;
  said drive pulley mechanism and said driven pulley mechanism each including an axially fixed member and an axially movable member, each said member including a conical surface which engages a side of said V-belt;
  said axially movable member of said drive pulley mechanism being disposed closer to said engine than said axially fixed member of said drive pulley mechanism; and
  said axially fixed member of said driven pulley mechanism being disposed closer to said wheel and more remote from said clutch than said axially movable member of said driven pulley mechanism.

14. A power transmission according to claim 13, further comprising:
  means operatively cooperating with said movable member of said drive pulley mechanism for moving said movable member toward said fixed member of said drive pulley mechanism as the number of revolutions of said engine increases, the effective diameter of said drive pulley mechanism being increased by said movement of said movable member toward said fixed member such that the travel of said V-belt around said drive pulley mechanism is displaced radially outwardly; and
  said movable member of said driven pulley mechanism being axially displaced in response to said radial displacement of said V-belt, to thereby decrease the effective diameter of said driven pulley mechanism and the ratio of speed change between said drive and driven pulley mechanisms, such that the speed of rotation of said driven shaft is increased.

* * * * *